US006652249B2

(12) United States Patent
Kenney et al.

(10) Patent No.: US 6,652,249 B2
(45) Date of Patent: Nov. 25, 2003

(54) BRUSHLESS DC WET MOTOR FUEL PUMP WITH INTEGRAL CONTROLLER

(75) Inventors: Thomas Kenney, Ashby, MA (US); Kirk Westphal, Southborough, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/780,941

(22) Filed: Feb. 9, 2001

(65) Prior Publication Data
US 2001/0051098 A1 Dec. 13, 2001

Related U.S. Application Data
(60) Provisional application No. 60/181,245, filed on Feb. 9, 2000, and provisional application No. 60/170,309, filed on Dec. 13, 1999.

(51) Int. Cl.[7] .............................................. F04B 17/00
(52) U.S. Cl. .................. 417/410.3; 417/359; 417/410.1; 310/87; 310/89
(58) Field of Search .......................... 417/359, 366, 417/410.1, 410.3, 360; 310/87, 71, 89, 68 B, 67 R, DIG. 6, 156.05, 156.06, 59, 58, 62, 63, 90, 261; 418/259

(56) References Cited

U.S. PATENT DOCUMENTS

| 2,832,292 | A | * | 4/1958 | Edwards ..................... 103/87 |
|---|---|---|---|---|
| 4,217,508 | A | * | 8/1980 | Uzuka ......................... 310/46 |
| 4,578,948 | A | * | 4/1986 | Hutson et al. ................ 60/487 |
| 4,604,665 | A | * | 8/1986 | Müller et al. ................ 360/97 |
| 4,955,790 | A | * | 9/1990 | Nakanishi et al. ........ 417/423.1 |
| 4,998,865 | A | * | 3/1991 | Nakanishi et al. .......... 417/366 |
| 5,053,664 | A | * | 10/1991 | Kikuta et al. ............. 310/68 B |
| 5,120,201 | A | * | 6/1992 | Tuckey et al. .............. 417/366 |
| 5,325,005 | A | * | 6/1994 | Denk ........................... 310/86 |
| 5,331,258 | A | * | 7/1994 | Lankin et al. .............. 318/139 |
| 5,747,910 | A | * | 5/1998 | Haner ......................... 310/180 |
| 5,810,568 | A | * | 9/1998 | Whitefield et al. ....... 417/423.8 |
| 6,011,703 | A | * | 1/2000 | Boylan et al. ................. 363/21 |
| 6,030,187 | A | * | 2/2000 | Whitefield et al. .......... 417/366 |
| 6,036,456 | A | * | 3/2000 | Peters et al. .............. 417/423.3 |
| 6,065,946 | A | * | 5/2000 | Lathrop .................. 417/423.14 |

FOREIGN PATENT DOCUMENTS

| EP | 0 733 803 A | | 9/1996 | |
|---|---|---|---|---|
| JP | 59196986 A | * | 11/1984 | ................. 418/225 |
| WO | 96/14511 A | | 5/1996 | |

OTHER PUBLICATIONS

Real Time Devices USA, Inc.,Feb. 26, 2002,Real Time Devices USA, Inc., ESC629 PC/104 utility ModuleTM, 2 pages.*
The First Universal MOSFET Receiver, Feb. 26, 2002, 1 page.*

* cited by examiner

Primary Examiner—Charles G. Freay
Assistant Examiner—John F Belena
(74) Attorney, Agent, or Firm—Renner, Otto, Boisselle & Sklar, LLP

(57) ABSTRACT

An integrated brushless DC wet motor pump unit comprises a pump, a motor and a motor controller all contained within a housing. The motor includes a stator having stator coils fixed in relation to the housing and a motor rotor surrounding the stator coils and supported for rotation in the housing. A drive coupling drivingly couples the motor rotor to a rotating pump element, and the drive coupling, rotating pump element and motor stator are radially supported on a central support member. The various motor and pump components are assembled into the housing from one axial end of the housing, with the motor rotor, drive coupling and rotating pump element having axially telescoping anti-rotation elements connecting the same for common rotation. The motor rotor includes a radially outer back-iron and a rotor magnet that is insert molded into the rotor back-iron that is rotatably supported at its outer diameter by a journal surface on an inner diameter surface of the housing. A sensor printed circuit board includes at least one sensor for sensing passage of the magnetic poles of the motor rotor for electronic commutation and motor speed control. Materials, fabrication, further components and assembly of the various pump unit components are described.

40 Claims, 13 Drawing Sheets

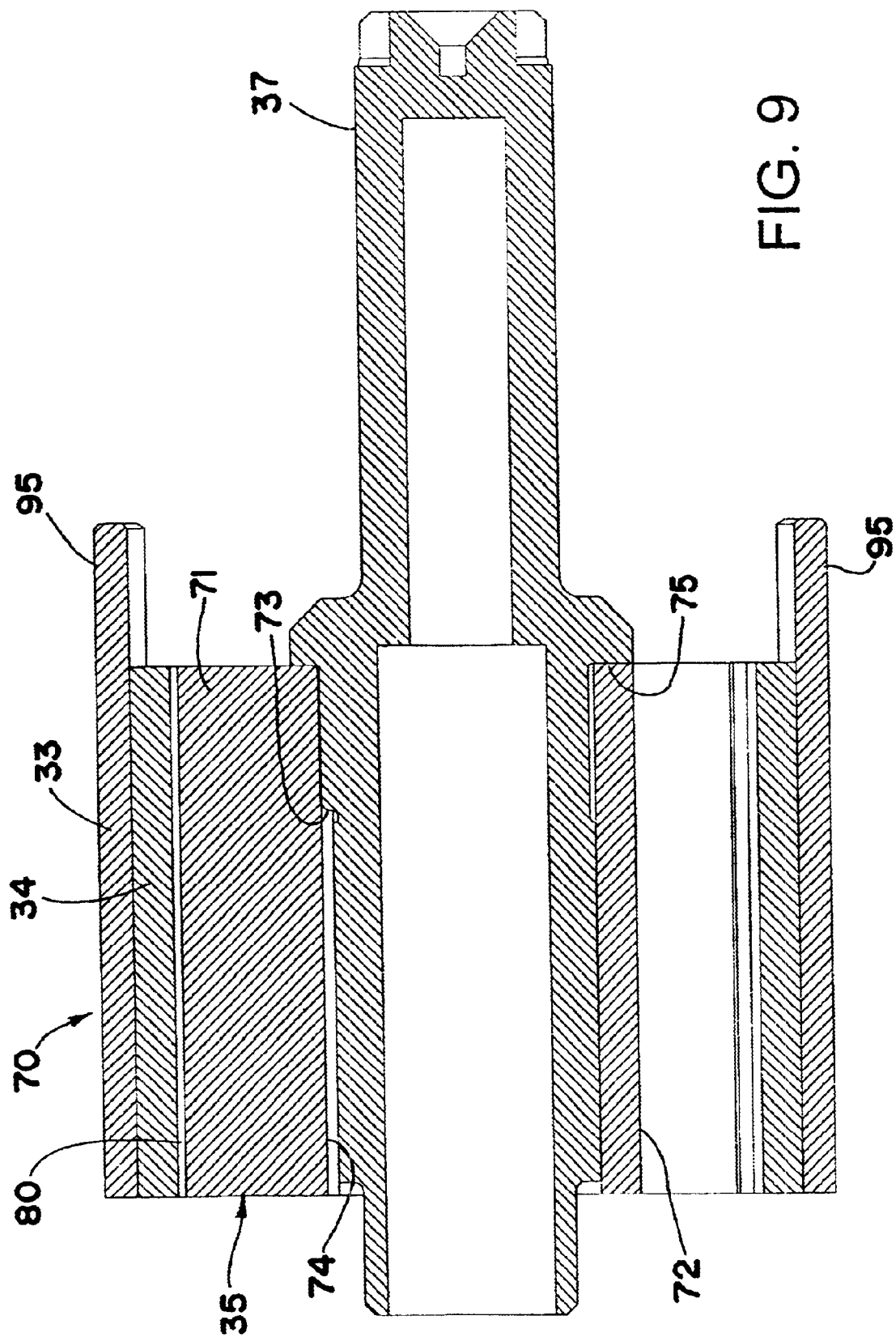

BRUSHLESS DC WET MOTOR FUEL PUMP WITH INTEGRAL CONTROLLER

RELATED APPLICATION DATA

This application claims the benefit of Provisional Application No. 60/181,245 filed on Feb. 9, 2000, and 60/170,309 filed Dec. 13, 1999.

FIELD OF THE INVENTION

The invention herein described relates generally to a self-contained electric motor driven pump unit and, more particularly, to such a pump unit that is particularly suited for use in diesel fuel delivery systems for engines.

BACKGROUND OF THE INVENTION

Various attempts have been made to integrate a pump, electric motor and electronic motor controller into a single compact package. Reference may be had to U.S. Pat. Nos. 4,955,790, 4,998,865, 5,053,664, 5,092,748 and 5,120,201, for examples. These prior attempts have associated therewith one or more drawbacks, including high cost, difficult assembly, poor performance and others. Thus, a continuing need remains for a commercially viable integrated pump-motor-controller unit that overcomes one or more these drawbacks.

SUMMARY OF THE INVENTION

The present invention satisfies the aforesaid need by providing an integrated pump unit having the below summarized and hereinafter described features.

According to one aspect of the invention, an integrated pump unit comprises a housing; a pump contained within the housing and including a rotating pump element; and a motor contained within the housing, the motor including a stator having stator coils fixed in relation to the housing and a motor rotor surrounding the stator coils and supported for rotation in the housing.

In a preferred embodiment, a drive coupling is provided for drivingly coupling the motor rotor to the rotating pump element. The drive coupling is radially supported independently of the motor rotor and the rotating pump element, and the pump unit may further comprise an axially extending central support member on which the drive coupling is rotatably supported. The stator may also be radially supported on the central support member.

The pump may be a rotary vane pump including a vane pump rotor supported on the drive coupling which in turn is supported on the central support member for rotation. Preferably the drive coupling is axially shiftable relative to the motor rotor and the rotating pump element.

A preferred drive coupling has a radially enlarged end portion for coupling to the motor rotor and a radially reduced end portion for rotatably coupling to the rotating pump element. The radially enlarged end portion of the drive coupling and the rotor have axially extending ribs and slots for rotatably coupling the drive coupling to the rotor. The rotating pump member may be rotatably supported on the radially reduced end portion of the drive coupling; and the radially enlarged and reduced end portions of the drive coupling may be joined by a plurality of radially extending spokes defining flow passages therebetween.

A preferred pump includes porting members on opposite sides of the rotating pump member for supplying and discharging fluid to and from the rotating pump member, and one of the porting members includes a central passage through which the radially reduced end portion of the drive coupling extends. The pump may include an eccentric ring sandwiched between the porting members and having an eccentric interior chamber, and the rotating pump member may include a vane pump rotor disposed in the eccentric interior chamber. The porting members, vane pump rotor and eccentric ring preferably are contained with the housing for limited axial shifting movement.

A preferred motor rotor includes a radially outer back-iron and a rotor magnet secured to the back-iron. The rotor magnet is made from a plastic bonded magnet material that is insert molded into the rotor back-iron. The motor rotor rotatably supported at its outer diameter by a journal surface on an inner diameter surface of the housing.

A sensor printed circuit board, which may be positioned adjacent an end of the rotor, includes at least one sensor for sensing passage of the magnetic poles of the motor rotor. The sensor or sensors preferably are Hall-effect sensors.

A motor controller may be contained with the housing, and more specifically in an electronics housing member. The controller preferably includes a printed circuit board contained with the electronics housing member. The electronics housing member has a pair of axially extending opposed channels, and the printed circuit board is axially inserted into and between the opposed channels.

According to another aspect of the invention, an integrated pump unit comprises a housing; a pump contained within the housing and including a rotating pump element; a motor contained within the housing, the motor including a stator having stator coils fixed in relation to the housing and a motor rotor surrounding the stator coils and supported for rotation in the housing; and an axially extending central support member mounted in the housing, the central support radially supporting the stator and pump rotor. In a preferred embodiment, the pump includes porting members on opposite sides of the rotating pump member for supplying and discharging fluid to and from the rotating pump member, and one of the porting members supports one end of the central support member. An anti-rotation connection preferably is provided between the one porting member and the central support member; and the porting members and pump member preferably are contained with the housing for limited axial shifting movement relative to the central support member.

According to a further aspect of the invention, an integrated pump unit comprises a housing; a pump contained within the housing and including a rotating pump element; a motor contained within the housing; and an axially extending central support member mounted in the housing against rotation, the central support and pump including telescoping anti-rotation elements cooperating to prevent rotation of the pump relative to the housing. In a preferred embodiment, the telescoping anti-rotation elements include axially extending tabs and slots.

According to yet another aspect of the invention, an integrated pump unit comprises a housing including an interior wall separating wet and dry portions of the housing; a pump contained within the wet housing portion and including a rotating pump element; a motor contained within the wet housing portion and drivingly connected to the pump; and a controller contained within the dry housing portion, and wherein the interior wall is made of a molded polymer material and has molded therein electrical pass-throughs via which the controller is connected to the motor.

According to still another aspect of the invention, an integrated pump unit comprises a housing including an interior wall separating wet and dry portions of the housing disposed along a longitudinal axis of the housing; a pump contained within the wet housing portion and including a rotating pump element; a motor contained within the wet housing portion and drivingly connected to the pump; and a controller contained within the dry housing portion, the controller including a printed circuit board axially inserted in the housing and axially mated with an electrical connector.

According to another aspect of the invention, an integrated pump unit comprises a housing including an interior wall separating wet and dry portions of the housing disposed along a longitudinal axis of the housing; a pump contained within the wet housing portion and including a rotating pump element disposed between inlet and outlet port members; a motor contained within the wet housing portion and including a motor rotor drivingly connected to the pump, the motor rotor being axially retained in a region bounded by the outlet port member and the interior wall; and a controller contained within the dry housing portion.

According to a still further aspect of the invention, an integrated pump unit comprises a housing including an interior wall separating wet and dry portions of the housing disposed along a longitudinal axis of the housing; a pump contained within the wet housing portion and including a rotating pump element disposed between inlet and outlet port members; a motor contained within the wet housing portion and including a motor rotor drivingly connected to the pump; a controller contained within the dry housing portion; and a printed circuit board contained within the wet housing portion and including at least one sensor for detecting a position of the motor rotor and providing such position to the controller.

Another aspect of invention provides an integrated pump unit comprising a housing; a motor contained within the housing; and a vane pump contained within the housing and driven by the motor, the pump including a pump rotor having a rotation axis and a plurality of circumferentially spaced apart grooves opening to an outer periphery of the rotor; an eccentric ring having a wall bounding a pump chamber that is eccentric to the rotation axis of the pump rotor; a vane contained within each groove of the pump rotor and cooperating with the pump chamber wall and pump rotor to form pockets that expand and contract in volume during rotation of the pump rotor within the pump chamber; and porting members on opposite sides of the pump rotor for supplying and discharging fluid to and from the pockets, at least one of the porting members including a pair of radially spaced apart arcuate ports for respectively communicating with radially inner and outer regions of the pocket.

A still another aspect of the invention provides an integrated pump unit comprising a housing having a longitudinal axis; a pump in the housing and including a rotating pump element disposed between inlet and outlet port members; a motor contained within the housing and including a motor rotor; and a drive coupling connecting the motor rotor to the rotating pump element, the drive coupling, rotating pump element and motor rotor including axially telescoping anti-rotation elements cooperating to connect the rotating pump element, drive coupling and motor rotor for common rotation while enabling axial assembly of the rotating pump element, drive coupling and motor rotor into the housing from one end of the housing.

According to a further aspect of the invention, an integrated pump unit comprises a housing; a pump in the housing; a motor contained within the housing for driving the pump; and a controller contained with the housing, the controller including Mosfet drivers and using synchronous rectification to minimize dissipation in the Mosfet drivers.

Further aspects of the invention relate to materials, fabrication and assembly of the various pump unit components as herein described.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 9 is a cross-sectional view of a motor sub-assembly included in the pump unit of FIG. 1.

FIG. 13 an axial end view of the electronics housing, taken from the line 13—13 of. FIG. 12.

DETAILED DESCRIPTION

Figure 1:
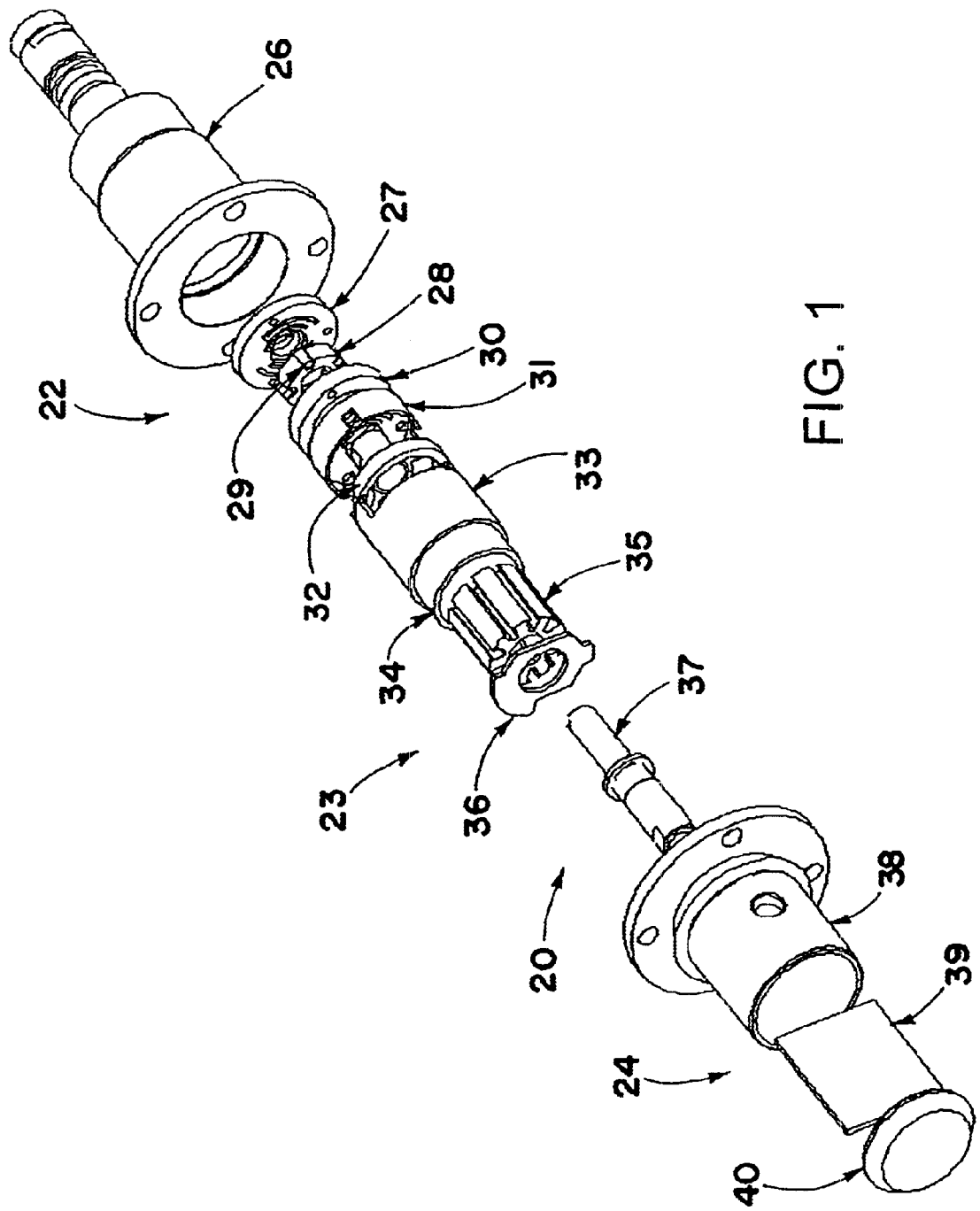
FIG. 1 is an exploded perspective view of a compact integrated pump unit according to the invention.

Referring now in detail to the drawings, and initially FIG. 1, an exemplary embodiment of a compact integrated pump unit in accordance with the invention is designated generally by reference numeral 20. The pump unit 20 generally comprises a pump section 22, a motor section 23 and a controller section 24, all of which are integrated into a single compact package. The pump section 22, as is preferred, includes a positive displacement pump and more particularly a roller vane pump; however, it will be appreciated that other types of pumps may be used, such as a gerotor pump. The motor section preferably includes a brushless DC motor, and the controller section preferably includes a Hall driven motor controller with velocity feedback. Overall, the pump unit is particularly suited for use in fuel delivery systems and especially for pumping diesel fuel, jet fuel, and the like, although a wide variety uses are contemplated. Accordingly, reference herein will be made chiefly to fuel as the fluid being pumped, although it should be understood that a pump unit according to the present invention may be used to pump other fluids.

Figure 2:
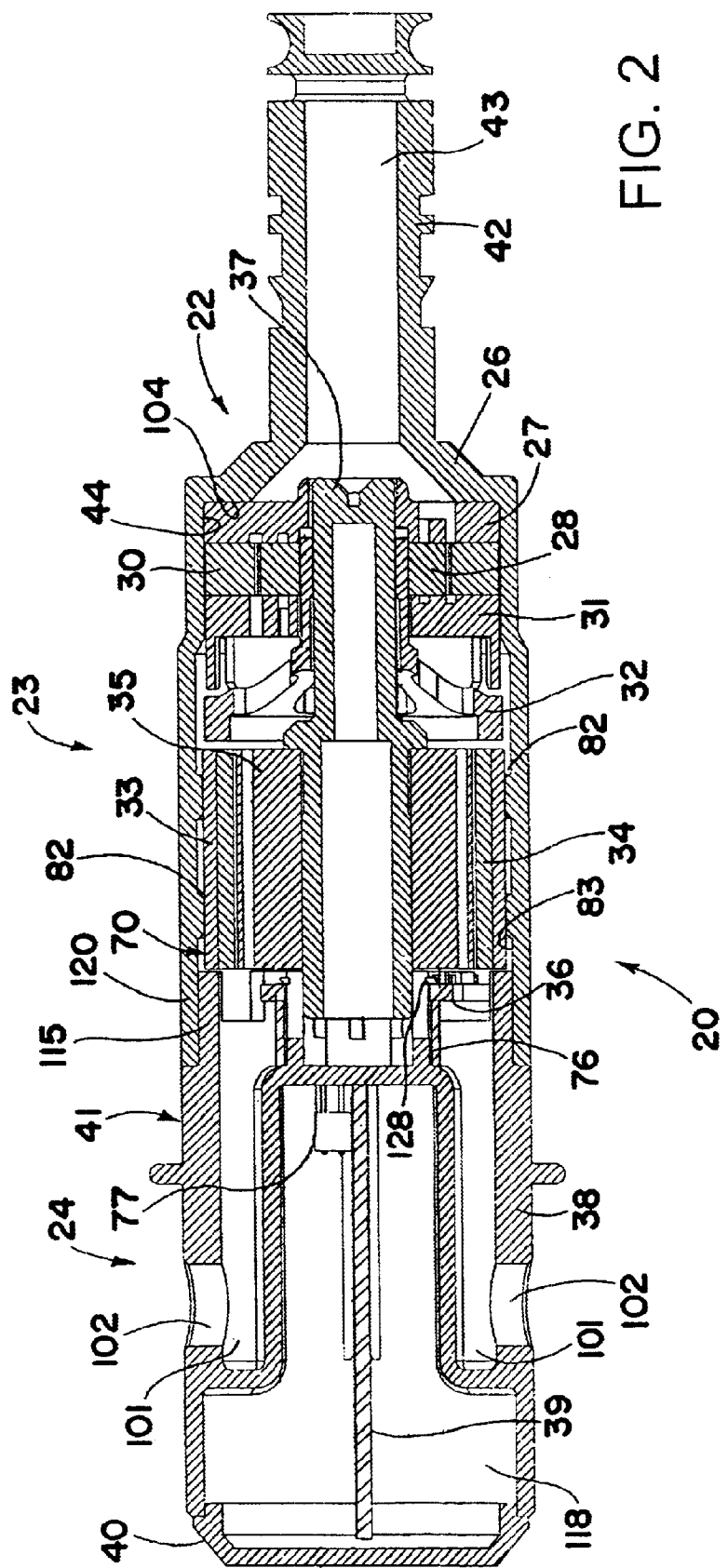
FIG. 2 is a longitudinal sectional view of the pump unit of FIG. 1, sans mounting flanges.

Going from right to left in FIG. 1, the major components of the pump unit 20 are a pump-motor housing 26, an intake port plate 27, a pump rotor 28, roller vanes 29, eccentric ring 30, discharge port plate 31, rotor-pump coupling 32, back-iron 33, magnet 34, motor stator 35, Hall sensor PC board 36, idler shaft 37, electronics housing 38, motor controller PC board 39 and end cap 40. The pump-motor housing 26, electronics housing 38 and end cap 40, when joined together as shown in FIG. 2, form a composite housing 41 for the pump unit 20. These various components are described in greater detail below.

Figures 3, 4:
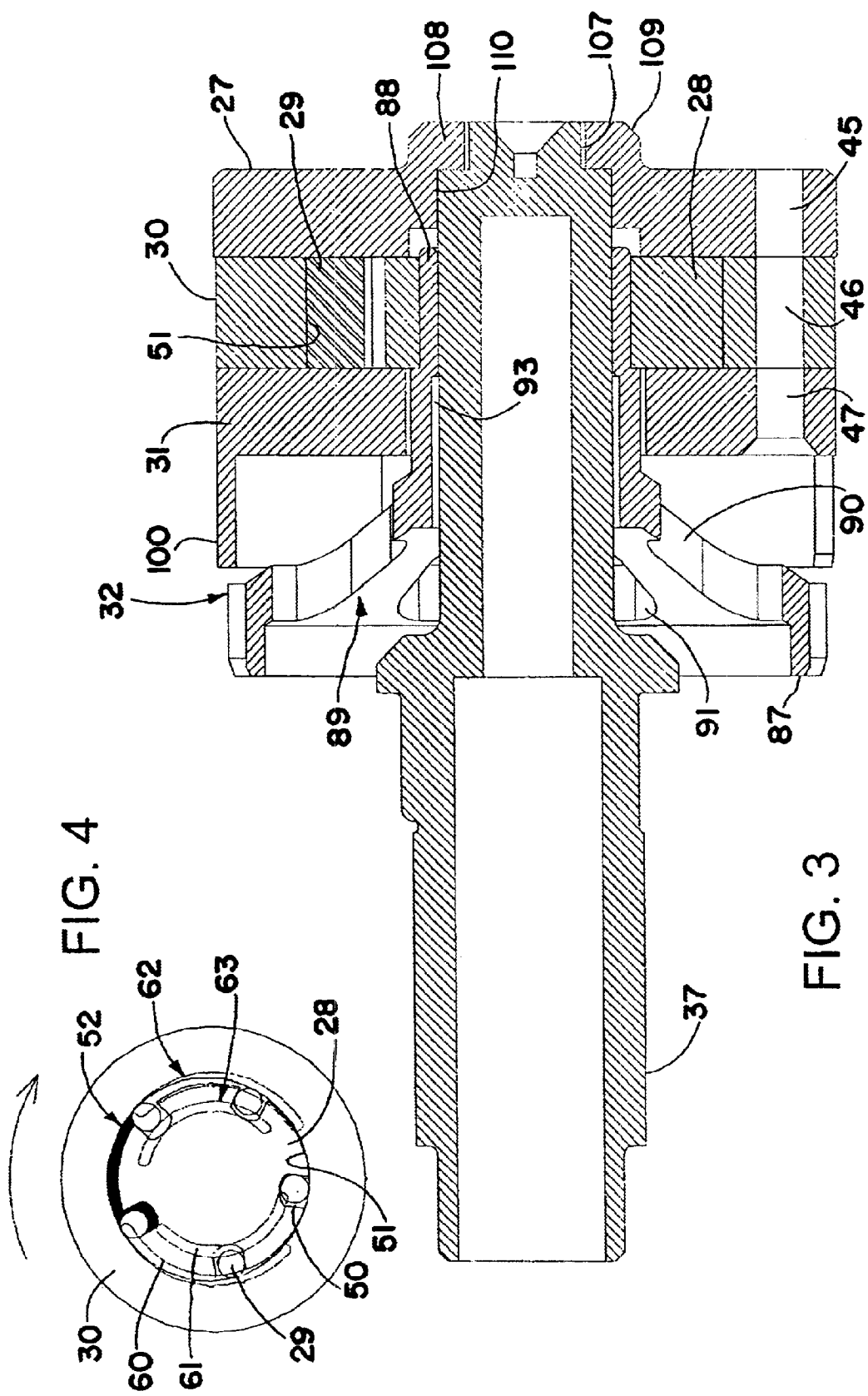
FIG. 3 is an enlarged view of a sub-assembly included in the pump unit of FIG. 1.
FIG. 4 is a schematic illustration showing fluid intake and discharge ports in relation to the pump rotor and roller vanes of a roller vane pump included in the pump unit of FIG. 1.
Figure 6:
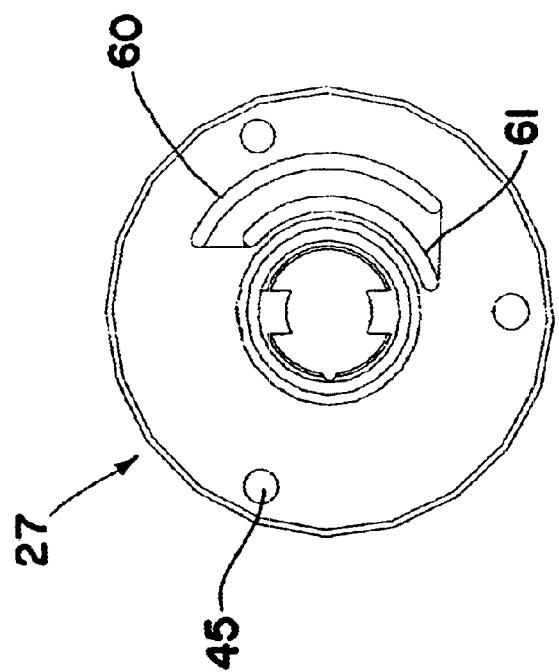
FIGS. 5 and 6 are opposite axial end views of an intake port plate forming part of a roller vane pump included in the pump unit of FIG. 1.
Figure 5:
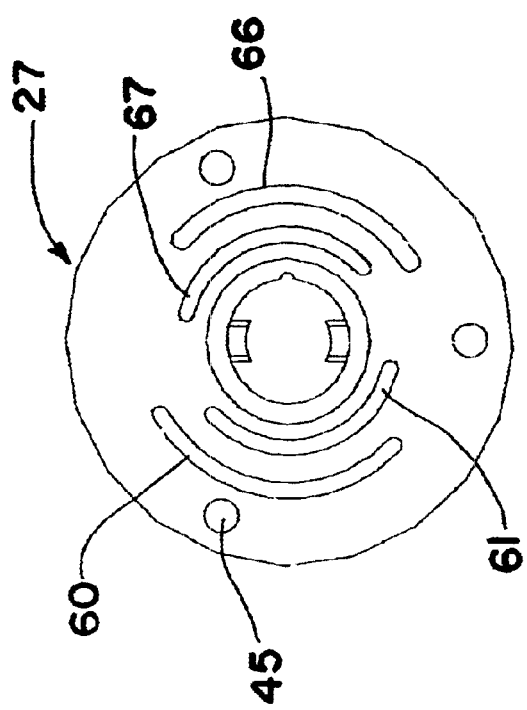
Figure 8:
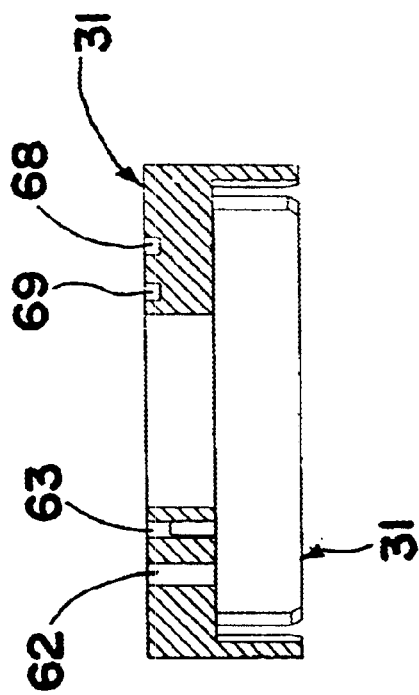
FIG. 8 is a cross-sectional view of the discharge port plate taken along the line 7—7 of FIG. 6.
Figure 7:
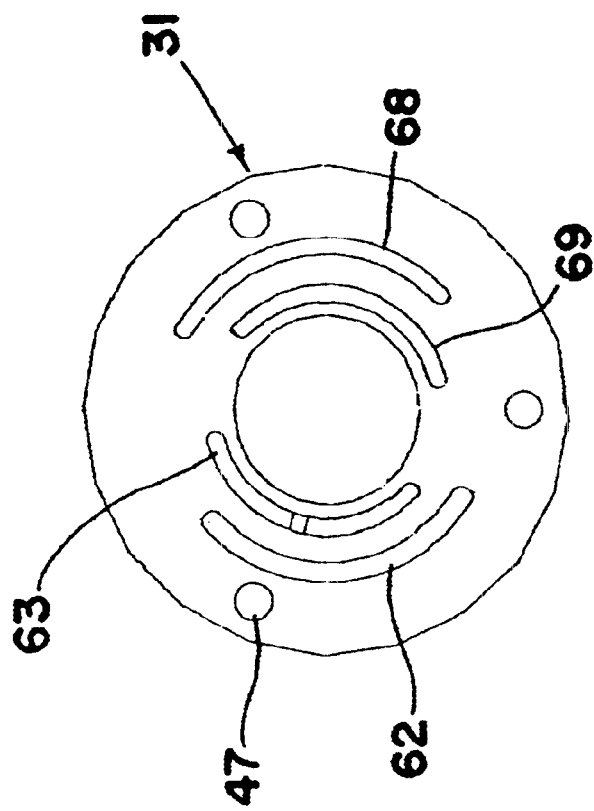
FIG. 7 is an axial end view of an discharge port plate forming part of a roller vane pump included in the pump unit of FIG. 1.

The pump-motor housing 26 has an intake nozzle 42 including an inlet passage 43 which supplies fuel (or other fluid to be pumped) to a pump chamber 44 in which the intake port plate 27, pump rotor 28, eccentric ring (race) 30 and discharge port plate 31 are located. As seen in FIG. 3, the eccentric race 30 is sandwiched between the intake and discharge port plates 27 and 31, and the pump rotor 28 is within the eccentric race between the port plates. Preferably the port plates and eccentric ring are fastened together by any suitable means, such as for example by three bolts (not shown) which are received in aligned holes 45–47 in the intake port plate, eccentric race and discharge port plate, respectively. Although not shown, each hole 45 in the intake port plate would typically be internally threaded so that the bolts can be screwed therein.

As best seen in FIG. 4, the pump rotor 28 includes radially opening grooves 50 in which the roller vanes 29 are retained. The roller vanes 29 and side walls of the grooves 50 and the inner wall surface 51 of the eccentric race 30 form cavities or pockets 52 between the roller vanes that expand and contract when the pump rotor is rotated within the eccentric race 30. Each fluid pocket 52 consists of two joined cavities, one outside the pump rotor and the other inside the roller vane groove.

With additional reference to FIGS. 5–8, the intake port plate 27 includes intake porting for supplying fuel to the expanding pockets 52 and the discharge port plate 31 includes discharge porting into which fuel flows from the contracting pockets. In the illustrated embodiment, two radially spaced apart arcuate intake ports 60 and 61 are provided in the intake port plate 27 for the intake and two radially spaced apart arcuate discharge ports 62 and 63 are provided in the discharge port plate for the discharge. The dual porting facilitates fluid free flow in and out of the pockets without squeezing by the restrictive clearance between the roller vane 29 and the pump rotor groove 50. The pump's internal fluid porting configuration maximizes the volumetric efficiency and ensures that fluid is not trapped in a pocket with changing volume. As shown, the intake and discharge port plates 27 and 31 have grooves 66, 67 and 68, 69 which respectively correspond to the ports 62, 63 and 60, 61 in the opposite port plates for balancing the pressure on either side of the rotor 28 and vanes 29.

In operation, the pump rotor 28 is rotated (or spun) by the motor section 23, for example at 5000 rpm, as in the manner described below in detail. As the pump rotor spins in the eccentric race 30, centrifugal force flings the roller vanes 29 outward against the race 30, and the pockets 52 expand and contract once per revolution. The rapid expansion of each pocket draws fluid axially through the intake ports 60 and 61. As the pump rotor and roller vanes continue their rotation, the pockets become sealed to the intake ports and opened to the discharge ports 62 and 63 of the discharge port plate 31 as the pocket contracts during the second half of rotation, this forcing out the fluid through the discharge ports.

The amount of rotation during which the pump section 22 can draw fluid may be maximized by setting the intake ports to start as soon as the pocket begins to expand and end as soon as the pocket reaches its maximum volume. In the illustrated embodiment the pocket 52 opens first to radially inner intake port 61 and then to the radially outer intake port 60. The pocket becomes closed to both intake ports as it opens to both discharge ports 62 and 63. The pocket is open to the discharge ports until it has reached its minimum volume and has therefore displaced its volume of fluid. The intake ports 60, 61 and discharge ports 62, 63 may be both open to the pocket 52 (overlapped) for a short time, for example, approximately 2–4 degrees of rotation of the pump rotor to prevent fluid from being trapped in a pocket with changing volume. This prevents over-pressurization of incompressible fluids that could cause erosion, excessive noise and reduced mechanical efficiency. This overlapped configuration results in some fluid leaking back to the intake ports, but this may be minimized by only overlapping the radially outer ports 60 and 62 with respect to the pocket 52. The radially inner ports 61 and 63 (for the inner pockets) are not overlapped, and are separated by an extended sealing surface.

As above indicated and referring to FIGS. 2 and 9, the pump rotor 28 is spun by the motor section 23. The motor section 23 preferably includes a rotary brushless DC motor including a rotating member 70 (the motor rotor) and a stationary member (the stator 35). There are several different topologies that a rotary brushless DC motor can have. A radial airgap motor can have the rotor as either the inner or outer member and the stator coils can be wound on a toothed iron structure or mounted on the surface of a smooth iron structure (slotless). Any combination of these will work; each will have certain characteristics that will be either an advantage or disadvantage for a specific application.

In the illustrated embodiment, improved efficiency and reduced manufacturing costs are obtained by using an inside-out arrangement of rotor 70 and stator 35, i.e., the rotor is disposed outside the stator. More particularly, an eight pole outer rotor and a 9-tooth inner stator configuration is used. Having the stator on the inside with the slot openings facing outward allows for low cost automated winding. In addition, the eight-pole/9-slot configuration allows for a very simple non-overlapped coil winding. The rotor 70 preferably is in the form of a drum including the magnet 34 and the back-iron 33, both of which are cylindrical. The magnet preferably is made from a plastic bonded magnet material that is insert molded into the rotor back-iron. The stator 35 preferably includes a stator core 71 including slots 72 in which the stator coils (not shown) are wound. The stator is telescopically mounted on the idler shaft 37 and coupled thereto for common rotation by at least one and preferably three equally circumferentially spaced apart molded-in keys 73 which engage in respective slots 74 molded into the inner diameter surface of the stator core 71. The stator is axially retained in place between an axial abutment formed by an annular shoulder 75 on the idler shaft and a hub 76 (FIG. 2) on a bulkhead 77 (FIG. 2) of the electronics housing 38.

The magnet 34 is separated from the stator 35 by a radial air gap 80, which for example may be about 0.019". As best seen in FIG. 2, the back-iron 33 is supported radially by two axially spaced-apart annular pads or runners 82 protruding radially inwardly from the inner diameter surface 83 of the pump-motor housing 26. During operation, the pads serve as journal supports for the back-iron, and as is discussed further below some of the discharge fuel is directed along the housing inner diameter 77 to provide lubricating film at the journals (hydrodynamic journal runners).

Figure 10:
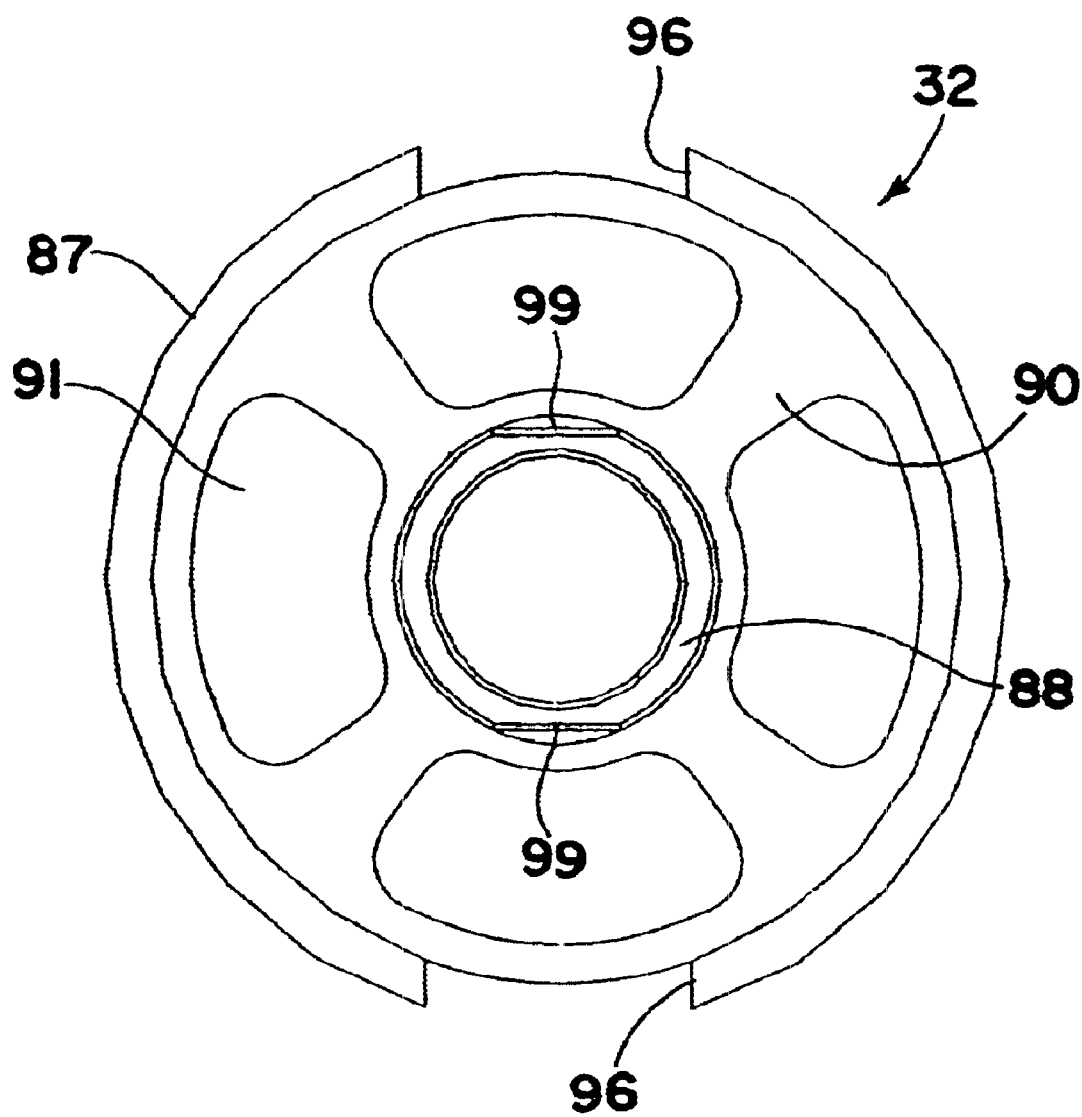
FIG. 10 is an axial end view of a drive coupling, looking from the pump section side thereof.

As shown in FIG. 2, the motor rotor 70 is coupled to the pump rotor 28 by the drive coupling 32. With additional reference to FIGS. 3 and 10, the drive coupling 32 has a large diameter ring portion 87 adjacent the motor rotor and a reduced diameter hub portion 88 axially offset from the ring portion for connecting to the pump rotor. As shown, the ring portion and hub portion are preferably integrally joined by a spider 89 consisting of a plurality of radially extending spokes 90 which form openings (fluid passages) 91 therebetween. The drive coupling, at the hub portion thereof, is supported for rotation on the idler shaft 37 radially inwardly of the pump rotor. The idler shaft functions as a journal surface for the drive coupling, and as discussed below the fuel is pressure fed underneath the coupling by way of a step 93 (FIG. 3) in its inner diameter for lubricating the journal surfaces.

The ring portion 87 of the drive coupling 32 is preferably coupled to the motor rotor 70 by one or more cooperating tabs and slots which interlock the motor rotor and drive coupling for common rotation while allowing relative axial shifting movement therebetween. In the illustrated embodiment, the back iron 33 has two tabs 95 (FIG. 9) which extend axially beyond the motor rotor 70 and stator 35 and which are spaced equally at 180 degrees to maintain balance in the rotating assembly. Each tab 95 is inserted into a slot 96 (FIG. 10) in the ring portion of the drive coupling.

The drive coupling 32 is coupled to the pump rotor 28 by means that provides for common rotation while preferably permitting relative axial shifting movement. More particularly, the hub portion 88 of the drive coupling pilots into the pump rotor, and engages it with two flat sections 99 which engage corresponding flats on the inner diameter surface of the pump rotor.

As will be appreciated and with reference to FIG. 2, the drive coupling 32 is free to float axially against the pump rotor 28 or against the motor rotor 70, both of which will be spinning at equivalent speeds, without transmitting axial force (other than its own weight depending on the orientation of the pump unit). The spinning components are retained axially by the port plates and housings, and each is allowed to safely float without binding. A small amount of backlash and radial clearance may be provided between the coupling and the back-iron to help ensure that the drive coupling pilots freely on the shaft only, and is not subjected to binding or unbalanced forces due to misalignment. Axial force on the pump rotor preferably is avoided to decrease drag and wear, and thus improve the mechanical efficiency of the pump. The motor rotor is axially retained primarily by magnetic attraction between the rotor and stator. Male tabs 115 on electronics enclosure 38 and a cylindrical extension 100 (FIG. 3) on the discharge port plate 31 serve to limit axial excursions of the motor rotor that might be caused by externally applied loads.

In view of the foregoing, the rotating components of the pump unit 23 are radially supported in two places, i.e., the drive coupling 32 on the shaft 37 and the motor rotor 70 on the housing 26. The bearing loads typically will be small, whereby the journal surfaces may be made of polymers blended with PTFE and supplied with fuel (or other fluid being pumped) under pressure as a lubricant.

Regarding the flow of fuel through the pump unit 20, the fuel that is discharged from the pump section 22 via the discharge ports in the discharge plate 31 is split for flow along two paths. One part of the flow passes through the wide openings 91 (FIGS. 3 and 10) in the drive coupling and on through the rotor-stator gap 80 (FIG. 9) and around the motor windings of the stator 35 (which are stationary). This flow path will provide continuous cooling of the motor windings. The remainder of the flow will pass around the outside diameter of the back-iron 33 and provide lubrication to the back-iron journals 82 (FIG. 2). Past the back-iron, the two flow paths converge and the fuel goes past the Hall sensor PC board 36 and out through two longitudinal ducts 101 (FIG. 2) in the electronics housing to outlet ports 102. Fuel passing through the ducts 101 cools the electronic components 39. Fuel may also fill the hollow shaft 37. The shaft 37, which may be injection molded, is hollow mainly for manufacturing ease and weight reduction, although it also could be used as a secondary flow path. The lubricating fuel also is ducted back to intake passage 43 along the outer diameter (journal bearing) of the idler shaft 37, and the constant pressure differential across the journal bearing will ensure a continuous flow of lubricating fluid. The re-circulating fluid has a negligible effect on the pump's overall discharge capacity.

The discharge pressure loads the housing 26 as a pressure vessel on its inner diameter. It also pushes the pump subassembly (intake port plate 27, discharge port plate 31, eccentric ring 27, pump rotor 28 and roller vanes 29) axially against a shoulder 104 at the inlet end of the housing 26. The pressure in the vane pump pushes the pump rotor radially against the drive coupling 32, which in turn pushes radially against the shaft 26. The shaft 26 is supported at one end by the intake port plate 27 and at it other end by the electronics housing 38. As is now evident, the idler shaft functions as a central support element on which the stator is mounted and on which the drive coupling and pump rotor are radially supported for rotation about the idler shaft. The idler shaft also preferably cooperates with the pump sub-assembly to prevent rotation of the port plates and eccentric ring. To this end and as shown in FIG. 3, the idler shaft preferably has at it pump end diametrically opposed slots 107 for receiving respective tabs 108 that extend radially inwardly from a hub portion 109 of the intake port ring 27. The hub portion 109 also has a center pilot hole 110 for receiving and supporting the pump end of the idler shaft. As will be appreciated, the idler shaft will be axially trapped between the bottom of the hole (or shoulder surface) and the electronics enclosure 38 when the idler shaft is assembled in the pump unit 20.

Figure 11:
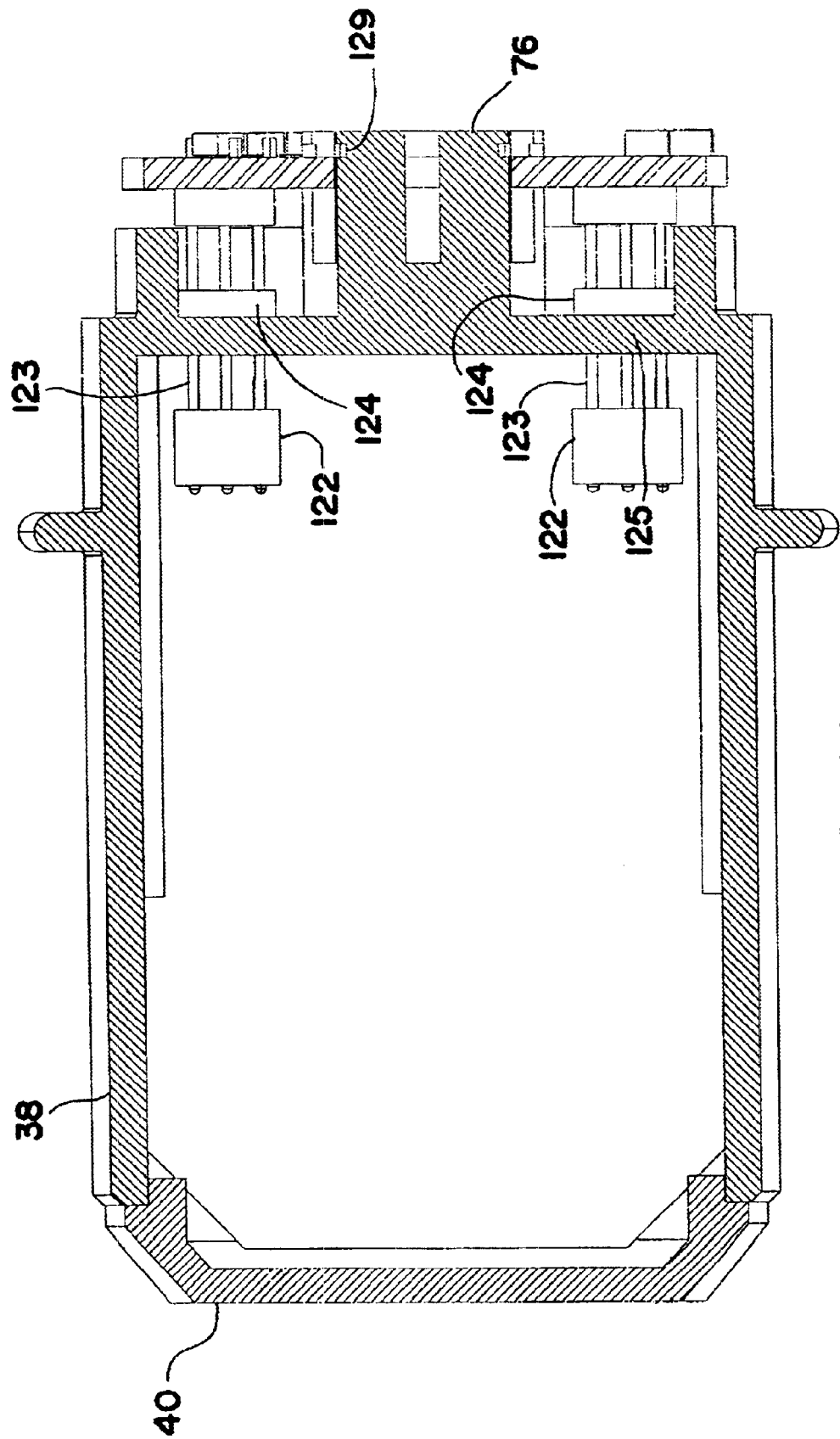
FIG. 11 is a cross-sectional view of an electronics housing-controller sub-assembly included in the pump unit of FIG. 1.
Figure 13:
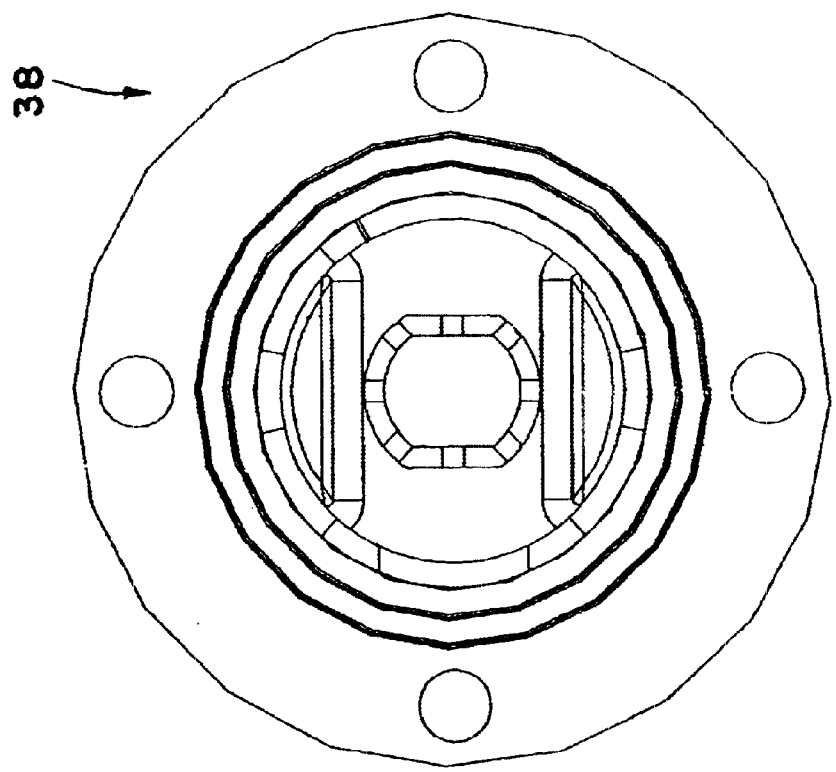
Figure 12:
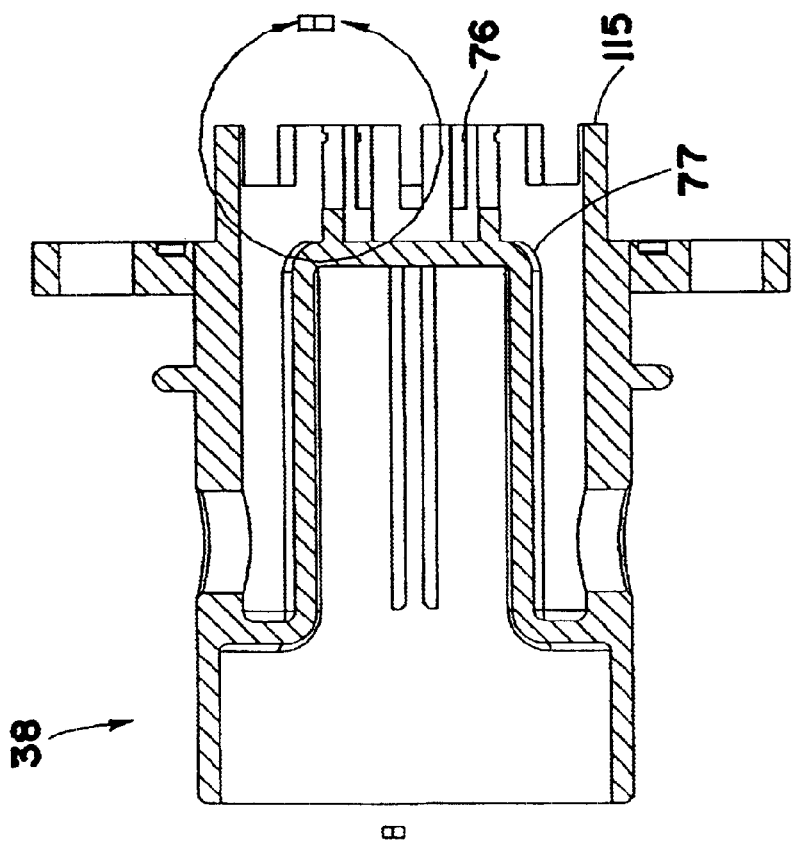
FIG. 12 is a cross-sectional view taken along the line 12—12 of FIG. 11, showing only the electronics housing.

Referring now to FIGS. 11–13, the electronics housing 38, as above indicated, has a bulkhead 77 from which a hub 76 projects. The hub is configured to both radially and axially support the adjacent end of the idler shaft as shown in FIG. 2. Flats in the hub 76 of electronics housing 38, which is bonded and fixed to housing 26, mate with flats on the shaft 37. Slots 107 in other end of shaft 37 mate with tabs 108 in port plate 27. This arrangement keeps stator 35, port plates 27 and 31 and eccentric ring 30 from rotating.

The electronics housing 38, when assembled to the pump-motor housing 26, closes the otherwise open end of the pump-motor housing. The two housing preferably are joined together at telescopically mating male and female attachment portions 115 and 116 thereof, which preferably are ultrasonically welded together. As above indicated, fuel is discharged from the pump through the passages 101 in the electronics housing, which passages are isolated from an interior electronics compartment 118 of the electronics housing by the bulkhead 77. The compartment 118 has an opening at its end opposite the hub 76 through which the motor controller PC board 39 can be inserted into the compartment. The opening is closed by the end cap 40 which is secured to the housing 38, as by ultrasonic welding or other suitable means.

As seen in FIGS. 11 and 12, the electronics housing 38 has is provided with a pair of axially extending opposed channels 120 which guide the printed circuit board into position during insertion of the board into the housing and which hold the printed circuit board in place once inserted. As seen in FIG. 11, the PC board and housing may have one or more electrical connectors which mate upon insertion of the board into the enclosure. In the illustrated embodiment the PC board has mounted thereto headers 122 for mating with the pins 123 of pass-throughs 124 preferably molded integrally into the bulkhead wall 125 as shown. The electrical pass-throughs provide for electrical connection with the stator windings and the Hall sensor PC board 36.

Figure 14:
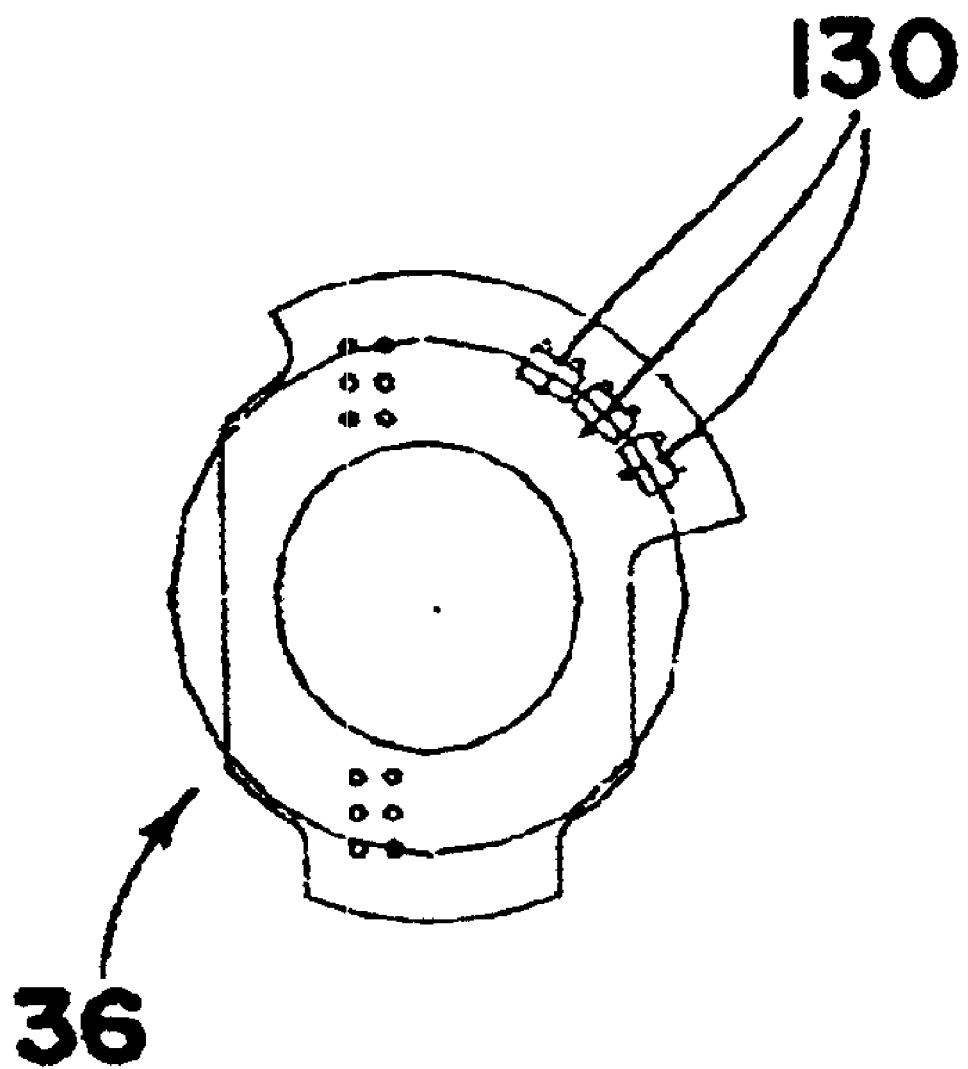
FIG. 14 is a plan view of a Hall sensor PC board taken along the line 14—14 of FIG. 11.

As seen in FIGS. 2 and 11, the Hall sensor PC board 36 is preferably telescopically mounted on the end of the hub 76 of the electronics enclosure and retained thereon by a suitable retainer 128 (FIG. 2) which fits in a groove 129 (FIG. 11) in the hub. When the electronics housing is assembled to the pump-motor housing 26, the Hall sensor PC board 36 will be located proximate an axial end of the rotor magnet. As discussed further below, the PC board 36 has one or more Hall sensors 130 (or if desired another type or types of sensors) for detecting the passage of the magnet poles and communicating with the controller PC board. An exemplary configuration of the sensor card with the sensors 130 is illustrated in FIG. 14.

Figure 15:
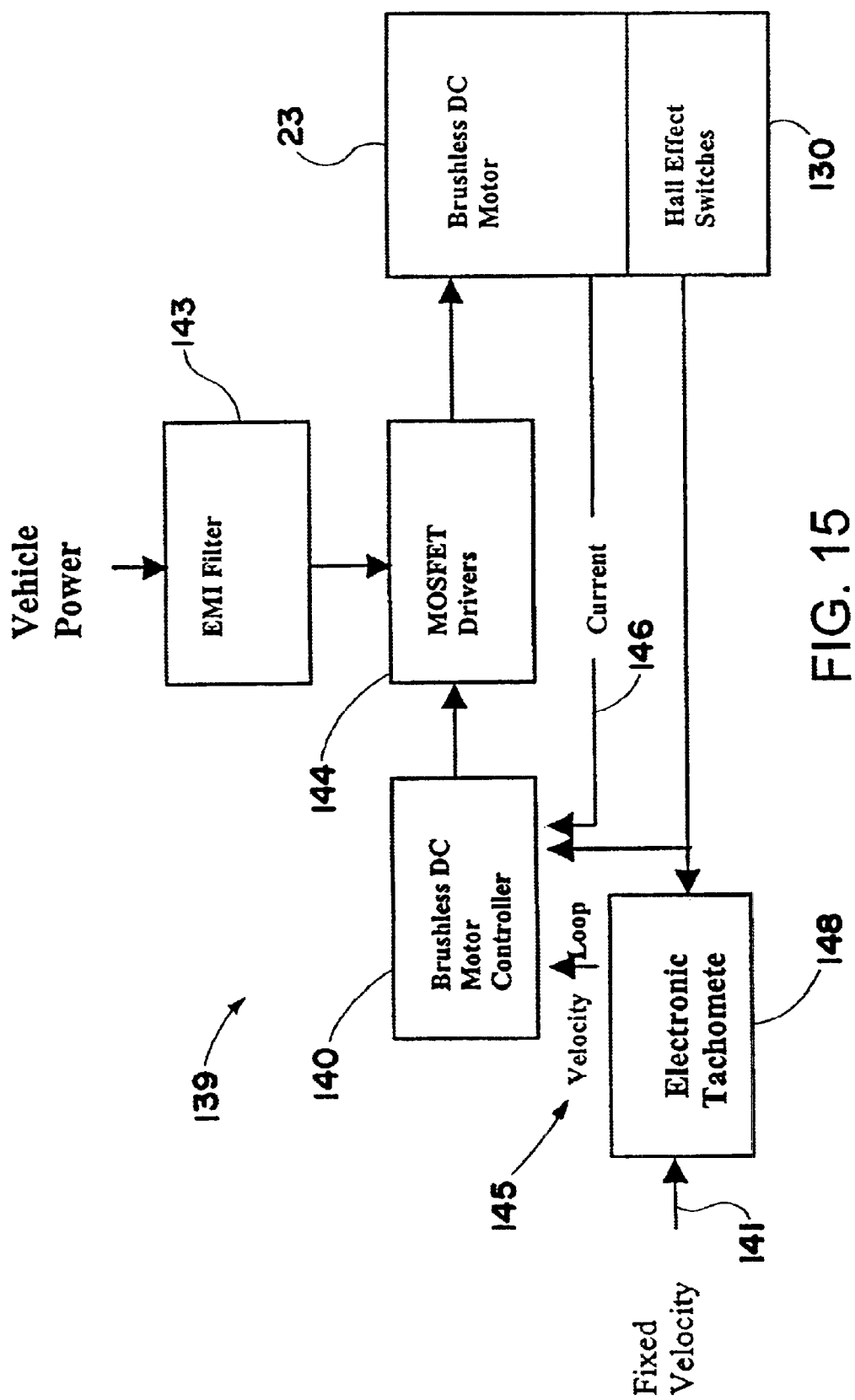
FIG. 15 is a diagrammatic illustration of an analog DC motor controller circuit.

Referring now to FIG. 15, one embodiment of a motor controller circuitry is designated generally by reference numeral 139. The controller 139 includes a Hall driven motor controller 140 for brushless commutation of the motor section 23. The Hall sensors 130 (FIG. 14) are a low cost means for sensing of the position and speed of the motor rotor 70 (FIG. 2). The controller uses the information from the Hall sensors to commutate the motor and control the motor speed. The controller may effect a closed loop speed control system by developing an error signal based on a comparison of the measured motor speed and a reference voltage indicating the desired motor speed. The controller may use high frequency (approximately 20 khz) pulse width modulation (PWM) to control the voltage applied to the motor. The PWM technique works by varying the time the voltage is on versus off, over each cycle of the high frequency excitation. The result is a stream of voltage pulses of variable widths applied to the motor. The average value of the pulse stream controls the motor speed and the motor inductance serves to filter out the higher frequency component. By changing the width of the pulses the average value is changed and therefore a wide range of motor speeds can be obtained.

The speed reference voltage that the controller 140 uses to develop an error signal may actually be a speed command signal that is an input to the controller via input 141. If the speed command were supplied externally, by an engine computer for example, then this would be a closed-loop, variable speed, motor-pump system. Alternatively, the command signal may be set internally to cause the motor to operate at a fixed speed. The controller will adjust motor voltage to overcome any load variations, and through its Hall sensor feedback loop, force the pump to operate at a constant speed regardless of discharge pressure or mechanical drag changes.

Either sine wave or six-state drives may be used to drive the brushless motor section. The sine-wave drive forces the current in each of the three motor phases to be a sinusoidal function of motor rotor position. This type of drive may employ a high-resolution, feedback device such as an encoder or resolver, although the same are typically only used in high performance positioning control systems. In a six-state drive only two of three phases are driven at a time. The current runs in opposite directions through each phase in the pair. Therefore, there are only six possible states that can occur (hence the name). The six-state excitation scheme is shown in the following Table A:

TABLE A

| | Six State Excitation | | |
|---|---|---|---|
| | Phase A Current Direction | Phase B Current Direction | Phase C Current Direction |
| 1 | + | | o |
| 2 | + | o | |
| 3 | o | + | |
| 4 | | + | o |
| 5 | | o | + |
| 6 | o | | + |

Since there are only six excitation states, the motor rotor position only needs to be quantitized into six discrete zones for each electrical cycle. (Note: an eight-pole motor has four electrical cycles per revolution.) Three Hall devices that are phase shifted by either 60 degrees or 120 degrees produces this result. The six unique combinations of Hall states can be used to determine which of the six 60 degree zones the motor rotor is in.

By mapping the Hall output combinations to the state table (Table A), any given set of Hall outputs corresponds to a particular state and therefore to a set of phase excitations that will produce a maximum positive torque. Maximum negative torque is obtained by either reversing the polarity of the excitation or using a state map that is three steps away (180 degrees). Maximum torque can be obtained by aligning the Hall board 36 (FIG. 14) so that state 1 excitation occurs when the motor rotor is between 60 and 120 electrical degrees. Then, when the motor rotor moves to between 120 and 240 electrical degrees the drive switches to state 2 excitation. The low speed torque ripple that results from this scheme may be reduced by precisely positioning the Hall sensors 130 and using Hall sensors that have low hysteresis.

The Hall devices 130 can also be used to obtain a speed signal, using any one of a number of methods. The output of each individual Hall device can be used in a frequency to voltage conversion process. The frequency of the Hall output at 5000 rpm would be 333 Hz, which corresponds to a speed update every 3 milli-seconds. The output from all three Hall devices can be used for averaging. Alternatively, the Hall transitions can be used to fire a pulse and the frequency of the pulses could be used for the speed signal. This frequency would be 2 kHz at 5000 rpm, which corresponds to a speed update every 0.5 milli-seconds. Usually some averaging or filtering is desirable because of Hall jitter and misalignment, but overall this arrangement is sufficient for lower performance velocity control systems.

The controller 140 shown in FIG. 15 is an analog motor controller. An EMI filter 143 conditions supply power and controls reversed voltage, over voltage, load dump, and RF emissions and susceptibility. The controller 140 uses a high voltage MOS integrated circuit (IC) 144 for its power drivers. The IC 144 contains commutation logic, current control, pulse width modulation (PWM) control, and a voltage regulator. Its function is to take a control signal from the velocity loop 145 and, based on the value, creates the PWM signal necessary to control the brushless DC motor 23. A current signal on line 146 from the motor controls the current in the motor at start up and in the case of overload. This prevents damage to the motor and the electronics.

The MOSFET drivers 144 contain low resistance, high speed, switches necessary to provide high current 3-phase drive to the brushless DC motor 23. The motor with the hall sensors 130 utilizes a unique 8 pole, inside out, motor configuration. As above indicated the Hall sensors provide the commutation signals. The Hall sensors monitor the fields from the motor magnets and provide a logic signal to the controller 140.

An electronic tachometer 148 uses the Hall sensor output to make a signal proportional to the speed (RPM) of the motor. The velocity loop 145 takes the tachometer signal and compares it to the velocity set voltage received at input 141. The difference between these two signals is conditioned and forms the control signal. The loop forces the two signals to be equal thus fixing the RPM of the motor.

Figure 16:
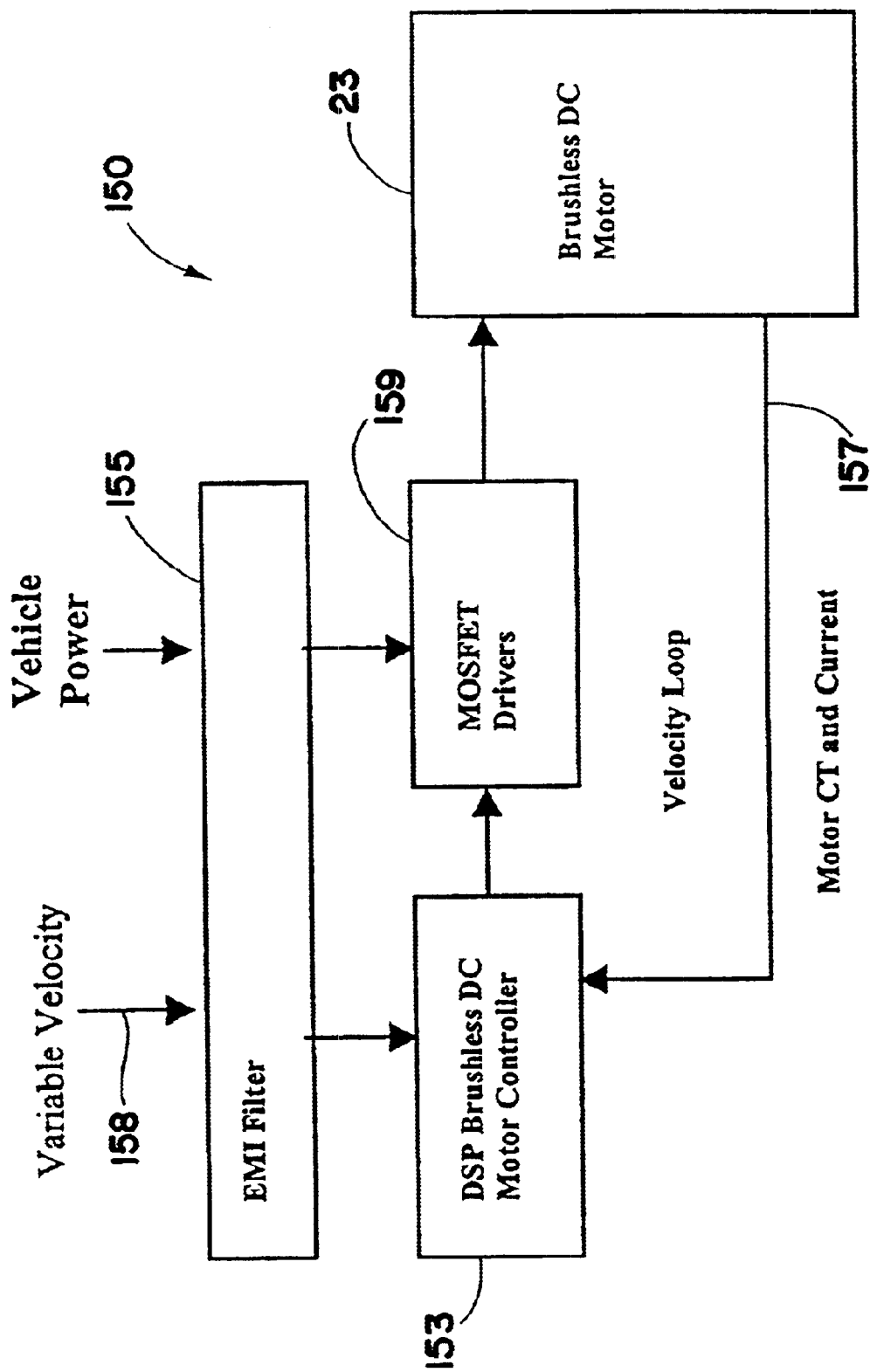
FIG. 16 is a diagrammatic illustration of a digital DC motor controller circuit.

Another embodiment of controller circuitry is designated generally by reference numeral 150 in FIG. 16. The controller circuitry 150 includes a digital signal processor (DSP) logic controller 153 that provides more sophisticated control and functionality, making it easier to interface with an engine control computer to provide on demand fuel flow. Additionally, this arrangement will lower cost, reduce weight and reduce space requirements. For instance, the need for the Hall sensor card may be eliminated.

The circuitry 150 includes an EMI filter 155 that conditions the input power. The EMI filter also contains provisions to control reversed voltage, over voltage, load dump, and RF emissions and susceptibility. A voltage regulator is used to provide a conditioned voltage to power the DSP chip 153.

The DSP motor controller 153 contains a fixed program high-speed microprocessor. The chip contains a high speed logic processor, analog-to-digital (A/D) conversion, PWM logic, program (fixed memory) and random access memory. The A/D is used to develop the commutation information from a motor center tap 157, and to control the motor current by monitoring the current signal. The A/D can also be used in a test mode to send fuel pump system status information over a system control data bus 158 over which the motor speed requirements may be supplied to the controller. The controller will maintain the motor speed to the requirements sent over the data bus or otherwise commanded. The tachometer function and velocity (RPM) function are done digitally by the controller.

The MOSFET power drivers 159 may contain low-resistance, high-speed, switches that provide high current 3-phase drive to the brushless DC motor 23.

Figure 17:
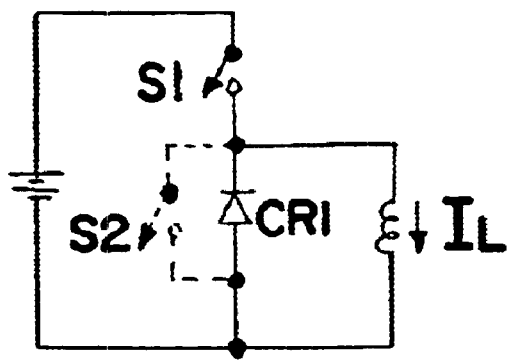
FIGS. 17 and 18 are a schematic circuit and phase chart illustrating application of synchronous rectification.
Figure 18:
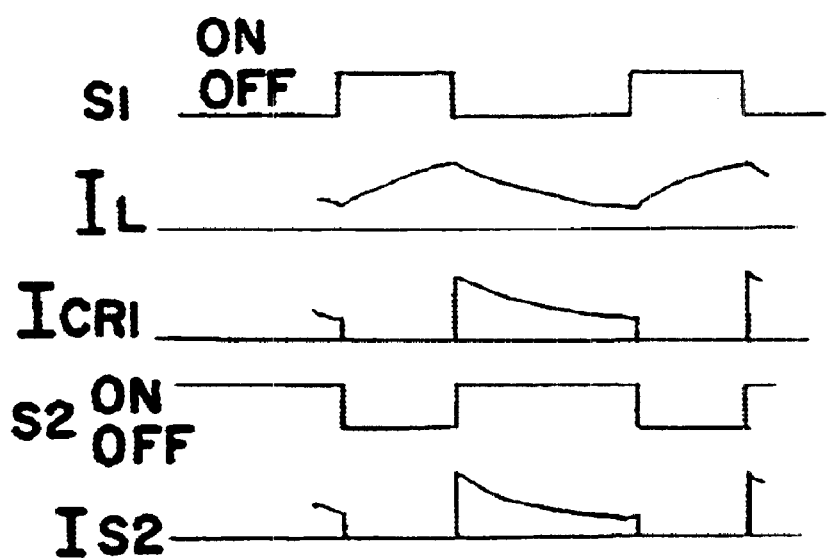

In FIGS. 15 and 16, synchronous rectification is used to raise efficiency by lowering the dissipation in the Mosfet drivers 144 (analog), 159 (DSP implementation). The facility to implement synchronous rectification is embedded in the motor controller 140 (analog), 153 (DSP). This technique, as illustrated in FIGS. 17 and 18, applies to actively driven inductive loads, as the phantom S2 would replace CR1. The switch S2 is operated in sync with S1. The reason that this technique is desirably used is to increase efficiency by minimizing dissipation. The voltage drop across the rectifier (CR1) is typically 0.7 volts. The voltage drop across S2 (which would replace CR1 in synchronous rectification) is typically 0.1 volts. The dissipation is reduced by the voltage difference 0.6 volts times the current in S2. The technique is often used in high efficiency switching power supplies, but can be adapted to any circuit that switches into an inductive load. The cost of this technique is S2 switch and the control complications of the synchronous drive. The drive must build in a "dead time" while both switches are off. If there was to be any "on time" overlap between the switches a high current path is created that could destroy both switches.

For constant speed applications, either controller 140, 153 may run on a standard 2-wire 12V input. For flow modulation, a third, low voltage wire may provide the control signal.

As is preferred, most of the housing and static pump components of the pump unit are made of polymers that can be injection or otherwise molded. The following is a schedule of preferred materials:

| | |
|---|---|
| Pump-motor housing 26 | Polybutylene terephthalate (PBT), glass filled, PTFE lubricated |
| Intake port member 43 | Polybutylene terephthalate (PBT), glass filled, PTFE lubricated |
| Pump rotor 28 | Powdered Metal - Distalloy |
| Roller vane 29 | Bearing grade hardened steel |
| Eccentric ring 30 | Powdered Metal - Distalloy |
| Discharge port member 31 | Polybutylene terephthalate (PBT), glass filled, PTFE lubricated |
| Drive coupling 32 | Nylon 6/6, glass filled, PTFE lubricated |
| Back-iron 33 | 430 stainless steel |
| Magnet 34 | Plastic bonded magnet material |
| Idler shaft 37 | Polybutylene terephthalate (PBT), glass filled, PTFE lubricated |
| Electronics housing 38 | Polybutylene terephthalate (PBT), glass filled, PTFE lubricated |
| End cap 40 | Polybutylene terephthalate (PBT), glass filled, PTFE lubricated |

The glass filled, PTFE lubricated, polybutylene terephthalate (PBT) may have a glass filling under 20% in order to avoid protrusion of abrasive glass against other sliding surfaces. Such material is resistant to diesel fuel, has high tensile strength due to the glass particulates, has low friction due to the PTFE lubrication, has good wear resistance, has good dimensional stability and creep resistance, is suitable for injection molding and ultrasonic welding, and is less expensive than other similar composite hybrids.

The glass filled, PTFE Lubricated, nylon a 6/6 has many of the advantages of the PBT. The drive coupling is the only composite component sliding against another composite component and making it of a different material reduces the risk of "running rough" due to uneven wear. However, not much wear is likely since the journal will be lubricated with pressurized fluid and both parts are inherently lubricated with PTFE.

The Disalloy powdered metal is commonly used for automotive pumping elements because of its durability and cost effectiveness. It is hardened to reduce wear and improve impact resistance, as is desired for long-term functionality of the rotor and eccentric ring. The rotor and the eccentric ring are both preferably made of this material or at least the same material to make the face clearance between the rotor and port plates insensitive to temperature variation, both having the same coefficient of thermal expansion.

430 stainless steel is a readily available ferro-magnetic material with good corrosion resistance. Stainless steels are widely used as back-irons in motor applications because of their ability to carry magnetic flux while resisting corrosion. Additionally, 430 stainless steel has good forming, machining, and welding ratings, which leave many options available for fabrication processes.

The roller vanes 29 preferably are made from standard bearing grade steel to help prevent wear and impact damage.

As can now be appreciated and with reference to FIGS. 1 and 2, the pump and rotor components can be axially inserted into the housing 26 from one end thereof, after which the electronics housing 38 can be secured as by ultrasonic welding to the housing 26 to maintain the pump and motor components assembled in the housing. Likewise, the controller PC board can be axially inserted in the electronics housing 38 and then the end cap 40 can be secured in place, as by ultrasonic welding. Accordingly, the pump unit can be easily assembled in a quick and efficient manner.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An integrated pump unit comprising:

a housing;

a pump contained within the housing and including a rotating pump element; and a motor contained within the housing, the motor including a stator having stator coils fixed in relation to the housing and a motor rotor surrounding the stator coils and supported for rotation in the housing;

wherein the motor rotor has at an axial end thereof adjacent the pump a drive coupling for drivingly coupling the motor rotor to the rotating pump element, and the drive coupling including fluid passages.

2. An integrated pump unit comprising:

a housing;

a pump contained within the housing and including a rotating pump element for pumping a fluid;

a motor contained within the housing, the motor including a stator having stator coils fixed in relation to the housing and a motor rotor surrounding the stator coils and supported for rotation in the housing; and a drive coupling for drivingly coupling the motor rotor to the rotating pump element; and wherein flow passages are provided for passage of the fluid over the stator and rotor.

3. A pump unit as set forth in claim 2, wherein the drive coupling is radially supported independently of the motor rotor and the rotating pump element.

4. A pump unit as set forth in claim 3, comprising an axially extending central support member on which the drive coupling is rotatably supported.

5. A pump unit as set forth in claim 4, wherein the stator is radially supported on the central support member.

6. A pump unit as set forth in claim 5, wherein the rotating pump element includes a vane pump rotor supported on drive coupling which in turn is supported on the central support member for rotation.

7. A pump unit as set forth in claim 2, wherein the drive coupling is axially shiftable relative to the motor rotor and the rotating pump element.

8. A pump unit as set forth in claim 2, wherein the drive coupling has a radially enlarged end portion for coupling to the motor rotor and a radially reduced end portion for rotatably coupling to the rotating pump element.

9. A pump unit as set forth in claim 8, wherein the radially enlarged end portion of the drive coupling and the rotor have axially extending ribs and slots for rotatably coupling the drive coupling to the rotor.

10. A pump unit as set forth in claim 9, wherein the rotating pump member is rotatably supported on the radially reduced end portion of the drive coupling.

11. A pump unit as set forth in claim 8, wherein the radially enlarged and reduced end portions of the drive coupling are joined by a plurality of radially extending spokes defining flow passages therebetween.

12. A pump unit as set forth in claim 8, wherein the pump includes porting members on opposite sides of the rotating pump member for supplying and discharging fluid to and from the rotating pump member, and one of the porting members includes a central passage through which the radially reduced end portion of the drive coupling extends.

13. A pump unit as set forth in claim 12, wherein the pump includes an eccentric ring sandwiched between the porting members and having an eccentric interior chamber, and the rotating pump member includes a vane pump rotor disposed in the eccentric interior chamber.

14. A pump unit as set forth in claim 13, wherein the porting members, vane pump rotor and eccentric ring are contained with the housing for limited axial shifting movement.

15. An integrated pump unit comprising:

a housing;

a pump contained within the housing and including a rotating pump element; and a motor contained within the housing, the motor including a stator having stator coils fixed in relation to the housing and a motor rotor surrounding the stator coils and supported for rotation in the housing; and wherein the motor rotor includes a radially outer back-iron and a rotor magnet secured to the back-iron, the housing has a radially outer wall, and the motor rotor is radially outwardly supported by the radially outer wall of the housing.

16. A pump unit as set forth in claim 15, wherein the rotor magnet is made from a plastic bonded magnet material that is insert molded into the rotor back-iron.

17. An integrated pump unit comprising:
a housing;
a pump contained within the housing and including a rotating pump element; and
a motor contained within the housing, the motor including a stator having stator coils fixed in relation to the housing and a motor rotor surrounding the stator coils and supported for rotation in the housing; and wherein the motor rotor is rotatably supported at its outer diameter by a journal surface on an inner diameter surface of the housing.

18. An integrated pump unit comprising:
a housing;
a pump contained within the housing and including a rotating pump element;
a motor contained within the housing, the motor including a stator having stator coils fixed in relation to the housing and a motor rotor surrounding the stator coils and supported for rotation in the housing; and
an axially extending central support member mounted in the housing, the central support radially supporting the stator and pump rotor, and the central support being supported by the housing at an end thereof located opposite the pump.

19. A pump unit as set forth in claim 18, wherein the rotating pump element includes a vane pump rotor supported on the central support member for rotation.

20. An integrated pump unit comprising:
a housing;
a pump contained within the housing and including a rotating pump element;
a motor contained within the housing, the motor including a stator having stator coils fixed in relation to the housing and a motor rotor surrounding the stator coils and supported for rotation in the housing; and
an axially extending central support member mounted in the housing, the central support radially supporting the stator and pump rotor, and the motor rotor being axially shiftable relative to the pump rotor.

21. A pump unit as set forth in claim 18, wherein the pump includes porting members on opposite sides of the rotating pump member for supplying and discharging fluid to and from the rotating pump member, and one of the porting members supports one end of the central support member.

22. A pump unit as set forth in claim 21, wherein an anti-rotation connection is provided between said one of the porting members and the central support member.

23. A pump unit as set forth in claim 21, wherein the porting members and pump member are contained with the housing for limited axial shifting movement relative to the central support member.

24. An integrated pump unit comprising:
a housing;
a pump contained as a separate element within the housing and including a rotating pump element;
a motor contained within the housing; and
an axially extending central support member mounted in the housing against rotation, the central support member and pump including telescoping anti-rotation elements cooperating to prevent rotation of the pump relative to the housing.

25. An integrated pump unit comprising:
a housing;
a pump contained within the housing and including a rotating pump element;
a motor contained within the housing; and
an axially extending central support member mounted in the housing against rotation, the central support and pump including telescoping anti-rotation elements cooperating to prevent rotation of the pump relative to the housing, and the telescoping anti-rotation elements including axially extending tabs and slots.

26. An integrated pump unit comprising:
a housing including an interior wall separating wet and dry portions of the housing disposed along a longitudinal axis of the housing;
a pump contained within the wet housing portion and including a rotating pump element disposed axially between inlet and outlet port members;
a motor contained within the wet housing portion and including a motor rotor drivingly connected to the pump, the motor rotor being axially retained in a region bounded by the outlet port member and the interior wall; and
a controller contained within the dry housing portion.

27. An integrated pump unit comprising:
a housing including an interior wall separating wet and dry portions of the housing disposed along a longitudinal axis of the housing;
a pump contained within the wet housing portion and including a rotating pump element disposed between inlet and outlet port members;
a motor contained within the wet housing portion and including a motor rotor drivingly connected to the pump;
a controller contained within the dry housing portion; and
a printed circuit board contained within the wet housing portion and including at least one sensor for detecting a position of the motor rotor and providing such position to the controller.

28. An integrated pump unit comprising:
a housing having a longitudinal axis;
a pump in the housing and including a rotating pump element disposed between inlet and outlet port members;
a motor contained within the housing and including a motor rotor; and
a drive coupling connecting the motor rotor to the rotating pump element, the drive coupling, rotating pump element and motor rotor including axially telescoping anti-rotation elements cooperating to connect the rotating pump element, drive coupling and motor rotor for common rotation while enabling axial assembly of the rotating pump element, drive coupling and motor rotor into the housing from one end of the housing, and wherein the drive coupling and motor rotor are axially shiftable relative to rotating pump element.

29. A pump unit as set forth in claim 1, wherein the drive coupling and motor rotor are axially shiftable relative to the rotating pump element.

30. A pump unit as set forth in claim 1, wherein the drive coupling has a radially reduced end portion for rotatably coupling to the rotating pump element.

31. A pump unit as set forth in claim 30, wherein the pump includes porting members on opposite sides of the rotating pump member for supplying and discharging fluid to and from the rotating pump member, and one of the porting members includes a central passage through which the radially reduced end portion of the drive coupling extends.

32. A pump unit as set forth in claim 17, wherein the journal surface is formed by axially spaced apart annular runners.

33. A pump unit as set forth in claim 17, wherein at least a portion of the flow from a discharge outlet of the pump is directed across the journal surface.

34. An integrated pump unit comprising: a housing;

a motor contained within the housing; and a vane pump contained within the housing and driven by the motor, the pump including:
- a pump rotor having a rotation axis and a plurality of circumferentially spaced apart grooves opening to an outer periphery of the rotor;
- an eccentric ring having a wall bounding a pump chamber that is eccentric to the rotation axis of the pump rotor;
- a vane contained within each groove of the pump rotor and cooperating with the pump chamber wall and pump rotor to form pockets that expand and contract in volume during rotation of the pump rotor within the pump chamber; and
- porting members on opposite sides of the pump rotor for supplying and discharging fluid to and from the pockets, at least one of the porting members including a pair of radially spaced apart, at least partially circumferentially overlapping, arcuate ports for respectively communicating with radially inner and outer regions of the pocket, and at least one of the porting members having arcuate grooves which respectively correspond to the arcuate ports in an opposite one of the port plates for balancing the pressure on either side of the rotating pump element.

35. An integrated pump unit comprising:

a housing:

a motor contained within the housing; and a vane pump contained within the housing and driven by the motor, the pump including:
- a puma rotor having a rotation axis and a plurality of circumferentially spaced apart grooves opening to an outer periphery of the rotor;
- an eccentric ring having a wall bounding a pump chamber that is eccentric to the rotation axis of the pump rotor;
- a vane contained within each groove of the pump rotor and cooperating with the pump chamber wall and pump rotor to form pockets that expand and contract in volume during rotation of the pump rotor within the pump chamber; and
- porting members on opposite sides of the rotor for supplying and discharging fluid to and from the pockets, at least one of the porting members including a pair of radially spaced apart, at least partially circumferentially overlapping, arcuate ports for respectively communicating with radially inner and outer regions of the pockets, and wherein the arcuate ports are arranged such that during rotation of the rotating pump element and a pocket past the arcuate ports, first one of the arcuate ports opens to the pocket and then the other opens to the pocket.

36. An integrated pump unit comprising:

a housing;

a motor contained within the housing; and a vane pump contained within the housing and driven by the motor, the pump including:
- a pump rotor having a rotation axis and a plurality of circumferentially spaced apart grooves opening to an outer periphery of the rotor;
- an eccentric ring having a wall bounding a pump chamber that is eccentric to the rotation axis of the pump rotor;
- a vane contained within each groove of the pump rotor and cooperating with the pump chamber wall and pump rotor to form pockets that expand and contract in volume during rotation of the pump rotor within the pump chamber; and
- porting members on opposite sides of the pump rotor for supplying and discharging fluid to and from the pockets, at least one of the porting members including a pair of radially spaced apart, at least partially circumferentially overlapping, arcuate ports for respectively communicating with radially inner and outer regions of the pockets, and wherein the arcuate ports in one of the porting members are intake ports, and the other porting member includes a pair of radially spaced apart, at least partially circumferentially overlapping, arcuate discharge ports.

37. A pump unit as set forth in claim 45, wherein the arcuate ports are arranged such that during rotation of the rotating pump element and a pocket past the arcuate ports, a trailing end of one of the discharge ports and a leading end of one of the intake ports will both communicate with the pocket for a limited time to prevent fluid from being trapped in a pocket with changing volume, thereby to prevent over-pressurization of an incompressible fluid.

38. A pump unit as set forth in claim 37, wherein only the radially outer arcuate ports of the discharge and intake ports will communicate with the pocket for a limited time.

39. An integrated pump unit comprising:

a housing having a longitudinal axis;

a pump in the housing and including a rotating pump element disposed between inlet and outlet port members; and a motor contained within the housing and including a motor rotor, the motor rotor having at an axial end thereof adjacent the pump a drive coupling for connecting the motor rotor to the rotating pump element, the drive coupling and rotating pump element including axially telescoping anti-rotation elements cooperating to connect the rotating pump element and drive coupling for common rotation while enabling axial assembly of the rotating pump element, drive coupling and motor rotor into the housing from one end of the housing.

40. An integrated pump unit comprising:

a housing;

a pump contained within the housing and including a rotating pump element;

a motor contained within the housing, the motor including a stator having stator coils fixed in relation to the housing and a motor rotor surrounding the stator coils and supported for rotation in the housing; and a controller contained within the housing; and wherein the housing includes an electronics housing member, and the controller includes a printed circuit board contained within the electronics housing member, and wherein the electronics housing member has a pair of axially extending opposed channels, and the printed circuit board is axially inserted into and between the opposed channels.

\* \* \* \* \*